Aug. 9, 1966  A. M. LAFONTANT ET AL  3,265,263
METHOD AND APPARATUS FOR OPENING EXPENDABLE FILM CARTRIDGES
Filed April 8 1965
3 Sheets-Sheet 1
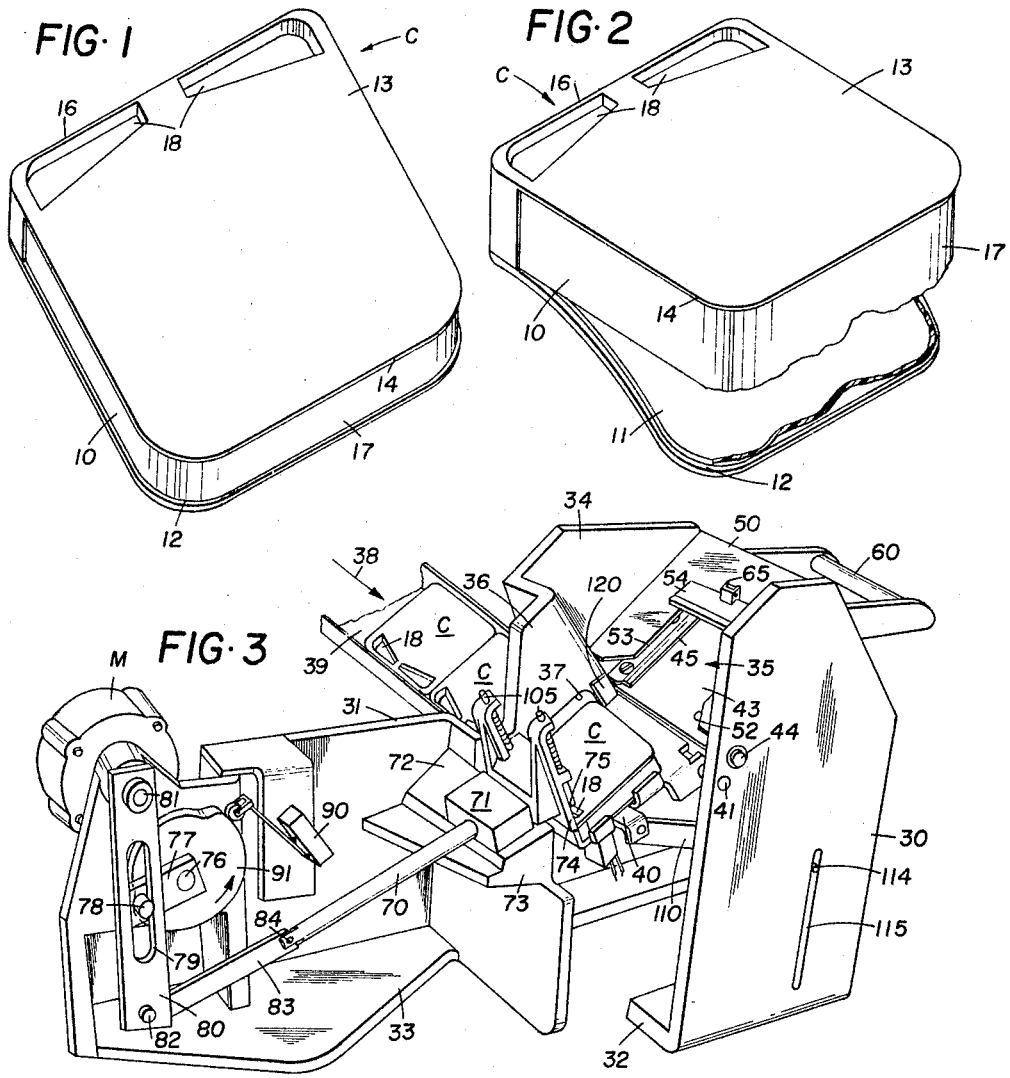
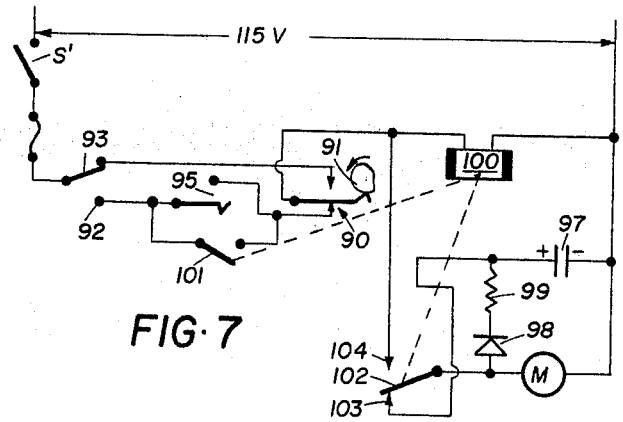
RAYMOND C. WEYL
ROBERT W. VREELAND
JAMES E. FERRIS
ALIX M. LAFONTANT
INVENTORS
BY R. Frank Smith
ATTORNEYS

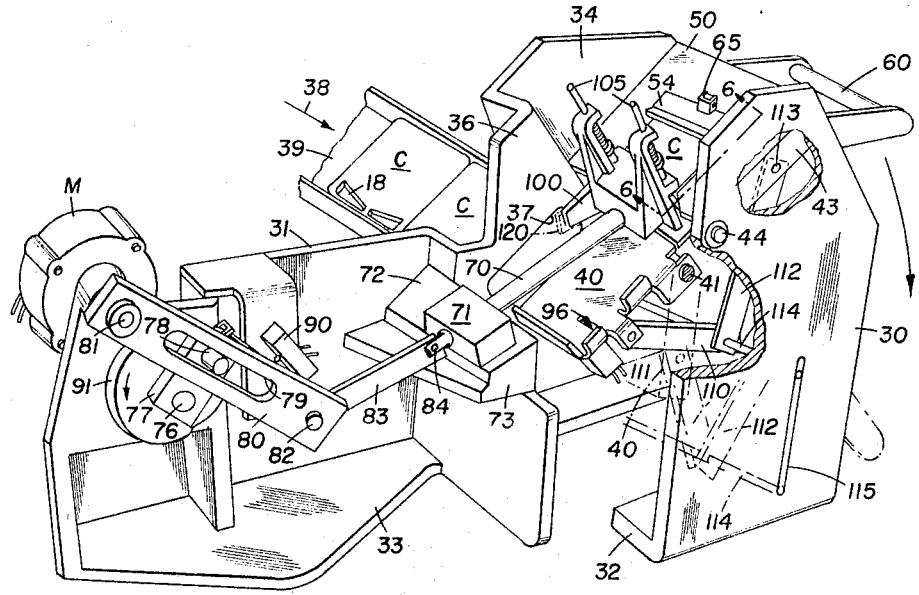
FIG·4
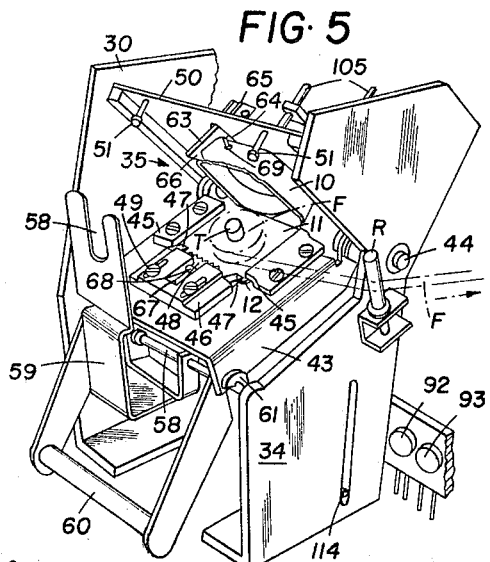
FIG·5
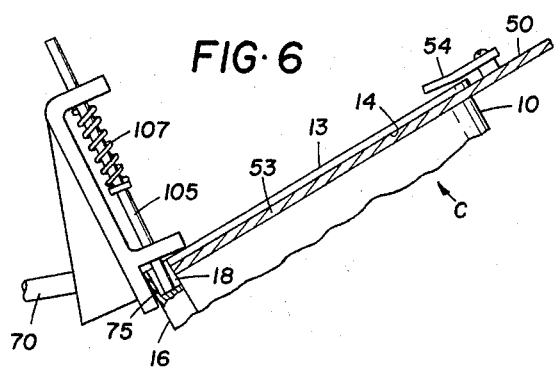
FIG·6
RAYMOND C. WEYL
ROBERT W. VREELAND
JAMES E. FERRIS
ALIX M. LAFONTANT
INVENTORS Aug. 9, 1966   A. M. LAFONTANT ETAL   3,265,263
METHOD AND APPARATUS FOR OPENING EXPENDABLE FILM CARTRIDGES
Filed April 8 1965   3 Sheets-Sheet 3
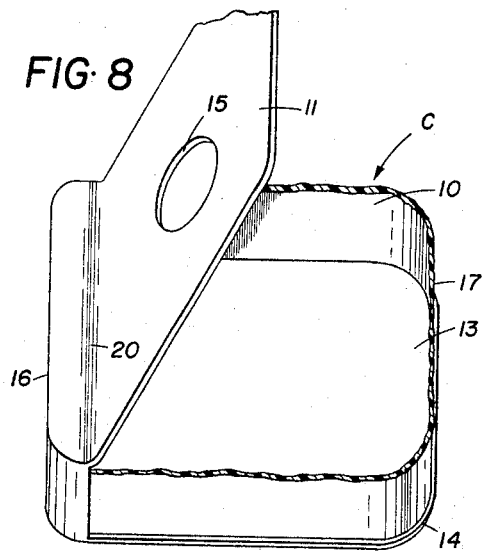
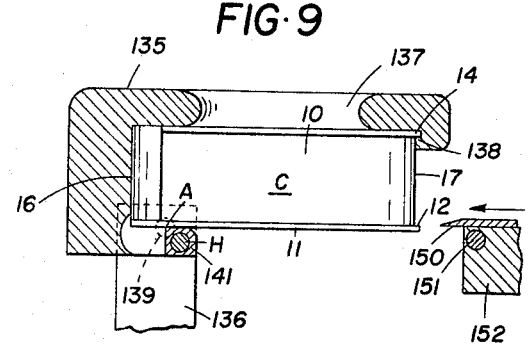
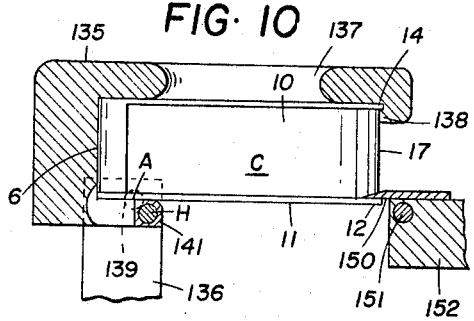
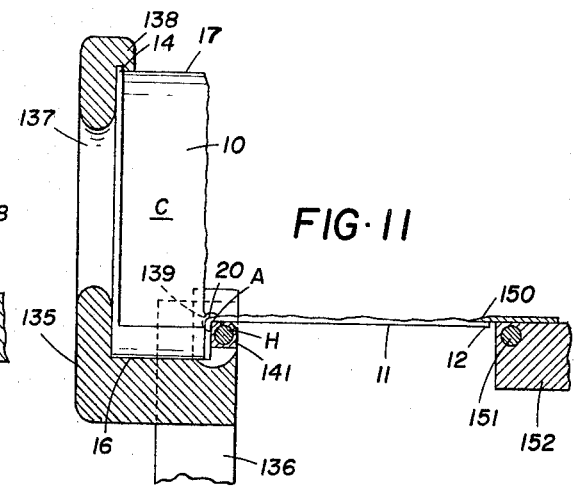
RAYMOND C· WEYL
ROBERT W· VREELAND
JAMES E· FERRIS
ALIX M· LAFONTANT
INVENTORS
BY *R. Frank Smith*
*Karl T. Claramny*
ATTORNEYS

United States Patent Office 3,265,263
Patented August 9, 1966

3,265,263
METHOD AND APPARATUS FOR OPENING EXPENDABLE FILM CARTRIDGES
Alix M. Lafontant, Fullerton, Calif., and James E. Ferris, Robert W. Vreeland, and Raymond C. Weyl, Rochester, N.Y., assignors to Eastman Kodak Company, Rochester, N.Y., a corporation of New Jersey
Filed Apr. 8, 1965, Ser. No. 446,527
19 Claims. (Cl. 225—2)

The present invention relates to expendable photographic film cartridges in which a roll of film is permanently sealed before, during and after exposure in a camera, and particularly to the method and apparatus for opening such cartridges after the film has been exposed to permit removal of the film from the cartridge for the processing thereof.

It is known in the photographic art to package a length of film in a plastic cartridge consisting of two plastic parts permanently sealed together by solvents and/or heat and pressure, e.g., the Kodapak cartridge used in the Kodak Instamatic Cameras. The film remains in this cartridge from the time it is originally packaged and after it is exposed in a camera, and in order to remove it from the cartridge for processing the processor has to destroy the cartridge.

It is now proposed to package motion picture film in an expendable plastic cartridge in which it will remain from the time it is packaged and sold, is exposed in a camera and is sent to a processor for processing. The processor will then have to break open the cartridge to remove the exposed film strip therefrom. Since motion picture film is generally processed in continuous processing machines, the films from many cartridges will generally be spliced end to end and wound upon a large supply reel from which they will be fed into the processing machine.

Such a film cartridge may, as disclosed in a copending U.S. patent application Serial No. 334,206 by E. A. Edwards and A. S. Tucker, filed December 30, 1963, consist of a substantially rectangular box in which a supply roll of film and a take-up spool therefor are rotatably mounted in coaxial side-by-side relation. As initially loaded the film leader will be pulled from the supply roll, threaded past an exposure aperture in one end wall of the cartridge and then attached to the take-up spool. After being so loaded with unexposed film the box member will be closed by a cover or covers which are then permanently sealed to the box by suitable solvents for the plastic material from which the cartridge parts are made and/or by the use of heat and pressure, or its equivalent, if the plastic material is one having thermoplastic characteristics. When the film in one of these cartridges is to be exposed, the cartridge is placed in a motion picture camera adapted to accommodate the same and the film advancing mechanism in the camera will intermittently advance the film from the supply roll, past the gate for exposure and wind it up on the take-up spool. When the film has been completely exposed, the cartridge is sent to a processor for processing of the exposed film therein. The processor must break this cartridge open so that he can remove the exposed film therefrom. After the cartridge is opened, the film may be removed therefrom in different ways. If the processor is one who handles a large volume of film, he will probably pull the end of the film from the cartridge, splice it to a leader or other film on a large rewind reel, and unwind it from the take-up spool in the cartridge while said take-up spool is maintained in a rotatable state in the opened cartridge. On the other hand, if the processor is one having a smaller volume of business, he might want to remove the entire take-up spool from the cartridge and place it on a spindle from which it can be wound onto a large processing supply reel or from which it can be fed directly into a processing tank adapted to handle short lengths of film. In any case, the opening of the cartridge by the processor and the removal of the film therefrom must be done in the dark because the film is still sensitive to light, and must be done in such a manner that the processor does not lose control of the spool of film in the cartridge and no chips of plastic result from opening of the cartridge which might become inadvertently engaged with the exposed film strip to scratch or otherwise damage it during the processing procedure.

Accordingly, the primary object of the present invention is to provide a method of opening a sealed film cartridge of the type described to permit an exposed film to be removed therefrom for processing.

Another object is to provide a method of opening a plastic film cartridge comprising a box-like member having a cover integrally sealed to the open end thereof by solvents and/or heat and pressure which includes the steps of grasping hold of both the cover and box-like member exclusively of each other, rupturing the seal between the cover and the box-like member at one edge of the cartridge, and spreading the two parts apart with a pivotal action about an axis adjacent the edge of the cartridge opposite the edge which was ruptured so as to tear the seal progressively from the point of rupture along two or three adjoining edges of the cartridge.

Another object is to use heat to facilitate the initial rupture of the seal between the cover and the box-like member of the cartridge and to destroy the plastic memory of the cover at the point it is hinged away from the box-like member so that it will remain open after the cover and box-like member are released by means by which they were grasped.

Another object is to provide apparatus for carrying out the noted methods of opening such film cartridges, and which apparatus is so designated that it can carry out said methods in total darkness with a minimum amount of dexterity and thought required of an operator.

A further object is to provide an apparatus for breaking open a sealed plastic film cartridge of the type described to permit removal of the film strip therefrom which comprises a cartridge receiver adapted to grab hold of both the box-like member and the cover of the cartridge to the exclusion of each other when the cartridge is inserted into the receiver manually or by a power-operated means; means for rupturing the seal between the cover and the box-like member along one edge of the cartridge when the cartridge is engaged by said receiver, either due to movement of the cartridge into the receiver engaging a stationary knife or due to movement of a knife against said cartridge after it is situated in said receiver; and means for separating the box-like member and cover after initial rupture of the seal between the two in such a manner as to tear the seal between the two progressively from the point of rupture along two or three adjoining edges of the cartridge. This separation can be accomplished by holding either the box-like member or the cover and then bending the other part away therefrom by swinging it about an axis adjacent the edge of the cartridge opposite that initially ruptured. While in the simpler apparatus the opened cartridge may be removed from the cartridge receiver by hand after it is emptied, in a more sophisticated apparatus the opening cartridge may be automatically retracted from the receiver and deposited in a waste receptacle when a power-driven reciprocal ram, which loads a cartridge into the receiver on its "In" stroke, moves on its "Out" stroke to its initial or "Loading" position. If the plastic material the cartridge is fabricated from is one having thermoplastic characteristics, a heated knife may be used to facilitate the initial rupture of the seal between the cover and the box-like member and the hinge area about which the cover is bent away from the box-like member may be heated sufficiently to soften the plastic and destroy its plastic memory so that the cover will remain open even after the opening force is removed therefrom.

The novel features that we consider characteristic of our invention are set forth with particularity in the appended claims. The invention itself, however, both as to its organization and its methods of operation, together with additional objects and advantages thereof will best be understood from the following description of the specific embodiments when read in connection with the accompanying drawings in which:

FIG. 1 is a perspective view of a film cartridge of the type which is to be opened in accordance with the present invention;

FIG. 2 is a perspective view of the film cartridge opened in accordance with one embodiment of the present invention;

FIG. 3 is a perspective view of a film cartridge opening device constructed in accordance with one embodiment of the present invention, the parts being shown in the position they assume when a film cartridge is placed on the loading table ready for insertion into the cartridge receiver where it is opened;

FIG. 4 is a view corresponding to FIG. 3, but showing the parts of the apparatus in the positions they assume when a film cartridge has been inserted into the cartridge receiver but before the cartridge is opened;

FIG. 5 is a perspective view of a part of the apparatus shown in FIGS. 3 and 4, but taken from the other side looking down into the cartridge receiver, and showing the parts thereof in the positions they assume after the cartridge has been opened and the film is being removed therefrom;

FIG. 6 is a sectional detail taken substantially on line 6—6 of FIG. 4, and showing how the ram means assumes control of the cartridge to remove the same from the receiver during its "Out" stroke;

FIG. 7 is a wiring diagram showing the control circuit of the motor for driving the ram means;

FIG. 8 is a perspective view of a film cartridge opened by a modified procedure which causes the cover to remain open after it is released from the opening apparatus;

FIGS. 9–11 are sectional schematic views showing an apparatus for opening a film cartridge in accordance with the modified technique depicted in FIG. 8; FIG. 9 showing the cartridge loaded into a cartridge receiver; FIG. 10 showing the heated knife moved to its cartridge rupturing position; and FIG. 11 showing the cartridge receiver rotated to its cartridge opening position after the seal between the cover and box-like member has been ruptured by the knife.

Since the present invention is not concerned with how the film strip is initially loaded into the film cartridge and the configuration of the interior of the film cartridge to properly guide the film strip from a supply roll past an exposure aperture and onto a take-up spool disposed coaxially with the supply spool, all of this being disclosed in co-pending application Serial No. 334,206 noted above and owned by the same assignee as the present application, none of these features are shown in the drawings of the present application. The present invention is concerned only with certain features of the outside configuration of the cartridge, the fact that it is permanently sealed closed, and the manner of removing or opening one wall thereof to allow the film strip after it has been exposed to be removed from the cartridge for processing.

Referring now to FIGS. 1 and 2, a film cartridge C is shown as comprising a box-like member 10 of a generally rectangular configuration and into the open side of which a supply roll of film and a take-up spool, not shown, can be loaded in any suitable manner. The box-like member 10 is preferably molded from a plastic material which is opaque to actinic light for protecting the film therein from being fogged. After the film is loaded into the box-like member 10 the open side therein is closed by a plastic cover member 11 which is also molded from a plastic material which is opaque to actinic light. The cover member 11 is slightly larger than the box-like member 10 so that the edges thereof overhang the side walls of the box-like member and provide a flange 12. The bottom 13 of the box-like member 10 may also be provided with a flange 14 to make it symmetrical with the cover member 11 and which flange is used for gripping the box-like member 10 during the opening procedure as will be described. The cover member is permanently sealed to the open end of the box-like member 10 by any suitable means, e.g., solvents for the plastic material or heat and pressure if the plastic material from which the cover and box-like member are made have a thermoplastic characteristic, so that after the sealing operation the cover and box-like member are essentially integral with one another. To facilitate interlocking the cover properly with the open end of the box-like member to insure a light-tight connection therebetween, a groove may be provided in the face of the cover member into which the open end of the box-like member might extend or the cover might have a flange extending from the face thereof to telescope with the open end of the box-like member 10 when they are assembled, not shown.

As more clearly shown in FIG. 8, the cover 11 is provided with a hole 15 in which a flange on the hub of the take-up spool, indicated at T in FIG. 5, in the cartridge may be rotatably mounted and through which hole a drive clutch in the camera is adapted to extend to drivingly engage a cooperating clutch member, not shown, on the end of the take-up spool to drive the spool when the cartridge is inserted into a camera. One wall 16 of the box-like member 10 which includes the exposure aperture, not shown, is thicker than the other walls thereof and will be designated the front wall of the cartridge to help specify the orientation of the cartridge when it is placed in the opening apparatus to be described. Accordingly, the wall 17 of the cartridge opposite the front wall 16 will be designated the rear wall. The bottom 13 of the cartridge is provided adjacent the front wall with two recesses 18 which are located approximately at the corners of the cartridge.

Referring to FIGS. 1 and 2, one method of opening the cartridge for removing the film therefrom will now be described. First the seal between the cover 11 and box-like member 10 at the back wall 17 of the cartridge, or the back wall proper adjacent this seal, is ruptured at two spaced points or along a given length thereof by inserting a knife or knives into the cartridge at this point. While we state that these knives rupture the seal between the cover and the box-like member and that the seal between these two parts is then progressively torn apart, it is pointed out that by reason of the fact that the seal between the cover and box-like member is in the nature of a welded joint which might be stronger than the walls immediately adjacent the joint, the knives in rupturing the seal may in effect break through the rear wall of the box-like member adjacent the seal referred to and the separation between the two parts will occur by reason of the wall of the box-like member being torn adjacent the seal rather than the seal proper being separated. In other words, instead of the seal between the cover and the box-like member being separated in a manner similar to the separation of two glued parts which results from a failure of the glue per se, the rupture of the seal in question here is comparable to the separation of two glued parts where the parts separate by reason of one of them breaking rather than having the glue connecting those parts separating. Accordingly, throughout the claims and specification when it is stated that the seal between the cover and box-like member is ruptured and/or torn apart, it is meant that either the seal itself is separated or that the material of either the box-like member or the cover adjacent this seal breaks apart to allow separation of the two members as will be described. This concept will be clearly apparent from an inspection of FIGS. 2 and 8 where the side wall of the box-like member 10 adjacent the cover 11 is shown broken adjacent the seal between the two at certain points along the seal rather than the seal being separated cleanly as the result of a breaking of any adhesive action along this joint.

After the back wall of the cartridge is ruptured by the insertion of one or more knives the box-like member 10 and the cover 11 are grasped exclusively of one another and are pulled apart by a pivotal or arcuate movement about a line adjacent the front wall of the cartridge. This separating force will tear the cover 11 progressively from the initial point of rupture at the rear wall along the entire length of the rear wall and down both adjoining edges of the box-like member. By reason of the cover being more flexible in a transverse direction than the box-like member it will bend away from the box-like member as the result of this separating force, see FIG. 2. Sufficient opening force is applied to the parts to tear the cover member from the box-like member 10 far enough to allow the cover to be bent back away from the box-like member to provide access to the film on the take-up spool therein, rather than tearing the cover completely off the cartridge, for reasons which will be apparent from a description of the apparatus used to open a cartridge, and then this force is maintained to keep the cover bent back while the film is removed. If the opening force were to be released after the cover 11 was torn away from the box-like member 10, as shown, the cover would snap back onto or toward the box-like member due to the inherent plastic memory of the material from which the cover is fabricated. While the cover is bent back away from the cartridge proper, as shown in FIG. 2, the film on the take-up spool therein is removed from the cartridge by attaching the free end of the film to a rewind reel, not shown, and rotating said reel to pull the film from the take-up spool while the latter is rotatably situated in the hole 15 in the cover 11, see FIG. 5.

To facilitate the initial rupture of the seal between the cover and box-like member and to eliminate the necessity of having to hold the cover bent in an open position while the film is being removed from the cartridge, another method of opening the cartridge is depicted in FIG. 8. In this method, which requires that at least the cover 11 be made of a plastic material having thermoplastic characteristics, the seal between the cover 11 and box-like member 10 is ruptured at one or more points along the back wall 17 of the cartridge but a knife heated to at least the softening point of the thermoplastic material is used to separate the two parts. Then after independently grasping the cover 11 and the box-like member 10 the two parts are pivoted in opposite directions as before to progressively tear the seal from the point of rupture to a hinge line 20 which is adjacent and substantially parallel to the front wall 16 of the cartridge and about which hinge line the cover 11 bends. This hinge line 20 in the cover is heated to the softening point of the plastic material of which the cover is fabricated in order to destroy the plastic memory of the material at this point. As a result, when the cartridge is opened in this manner the cover will remain open without an opening force being maintained thereon and the opened cartridge can be removed from the opening device and placed on another device for removal of the film from the cartridge. This technique increases the output which one operator can produce since an opened cartridge can be removed from the opening device and placed in a rewinder for unloading the film therefrom while another cartridge is being placed in the opening device to be opened.

Referring now to FIGS. 3–6, a cartridge opening device for carrying out the method of opening a cartridge as depicted in FIGS. 1 and 2 will be described. The device comprises a pair of spaced vertical walls 30 and 31 which each have horizontal feet 32 and 33, respectively, for engaging a horizontal table, not shown. The wall 31 is irregular in shape and includes a front portion 34 spaced from the wall 30 to support a film cartridge receiver, indicated generally at 35, therebetween, an offset portion 36 provided with an opening 37 through which a film cartridge C can be pushed in the direction of the arrow 38 from an inclined loading tray 39 onto a loading table 40 when the latter is in its loading position, see FIG. 3. The loading table 40 is pivoted at its forward end on pivot pins 41 in wall 30 and offset portion 36 of wall 31 to move between a loading position shown in FIG. 3, wherein it is inclined upwardly to the horizontal and is in the plane of the loading tray 39, and an inoperative position, wherein it extends vertically downward as shown in broken lines in FIG. 4.

A cartridge receiver 35 located above the loading table 40 comprises a supporting platform 43 pivoted at one end on a pair of pins 44 in walls 30 and 34 to move between a cartridge receiving position, shown in FIG. 3, and a cartridge opening position, shown in FIG. 5. In its cartridge receiving position the platform 43 lies in substantially the same inclined plane as the loading table does when in its loading position so that a cartridge C can be shoved upwardly from the loading table onto the supporting platform by a ram mechanism as will be described hereinafter. Fixed in spaced relation on the top of the platform 43 are a pair of offset clamps or gibs 45 under which the flange 12 extending along two opposite edges of the cartridge cover 11 is captured as the cartridge is shoved upwardly onto the platform 43 from the loading table 40. Accordingly, the cover of the cartridge is clamped to the supporting platform when it is shoved into the receiver 35.

Also fixed to the supporting platform 43 beyond, and in between, the gibs 45 is a knife member 46 comprising a pair of narrow sharpened blades 47 spaced apart to perforate or rupture the seal between the box-like member 10 and cover 11 of the cartridge as it is pushed up onto the supporting platform by a ram mechanism. While in most instances it has proved sufficient to rupture the seal between the box-like member and the cover at only two spaced points, in some instances it has been found desirable to rupture the seal at this point along practically the entire length of the rear wall 17 of the cartridge. To this end a serrated plate 48 is shown extending between the sharpened blades 47, see FIG. 5. The knife member 46 is adjustably mounted on platform 43 by means of screws engaging slots in the knife member, as indicated at 49 in FIG. 5, so that the knife member can be adjusted relative to the loading stroke of the ram mechanism to insure that the seal between the cover 11 and box-like member 10 of the cartridge will be properly ruptured as the cartridge is pushed into the receiver by the ram mechanism.

Extending between and fixed to the supporting walls 30 and 34 is a plate 50 which is also inclined to the horizontal by the same amount as the platform 43 when the latter is in its cartridge receiving position. Fixed to, and extending downwardly from, the underside of the plate 50 are a pair of adjustable stop screws 51 which engage the top of the platform 43 when the latter is pivoted to its cartridge receiving position. These screws limit movement of the platform 43 toward plate 50 and position it in spaced parallel relation therewith, this spacing being less than the overall thickness of the cartridge by an amount equal to the thickness of flange 14 extending around the bottom 13. Referring to FIGS. 3 and 4, the edge of the plate 50 toward the loading table 40 is notched out, as indicated at 52, to receive the rear end of the cartridge as it is shoved from the loading table 40 into the receiver 35 by the ram mechanism, and the edges of the plate 50 bounding the notch, as indicated at 53, slide under and overhang the flange 14 along opposite edges of the bottom 13 of the cartridge so that the box-like member 10 is clamped to the plate 50 exclusively of cover member 11. Fixed in spaced relation to the top surface of the plate 50 at the dead end of the notch therein is a lip member 54 which will overhang the rear end of the cartridge as it is shoved into the receiver to keep the cartridge from being accidentally pushed up and away from the plate 50 for any reason while it is being loaded into the receiver.

It will thus be seen that after a cartridge C is shoved upwardly from the loading table 40 into the cartridge receiver 35 the box-like member 10 of the cartridge will be clamped to the stationary plate 50 and the cover 11 will be clamped to the supporting platform 43. Also, the seal between the box-like member 10 and the cover 11 will have been ruptured at spaced points, or along the entire length of the rear wall 17 of the cartridge. Now as the supporting platform 43 is swung downwardly about its pivot pins 44 to its cartridge opening position shown in FIG. 5 the cover member 11 will be forceably swung away from the box-like member 10, and starting at the points of rupture at the rear wall of the cartridge the seal between the box-like member 10 and cover 11 will be progressively torn along the rear end and the adjoining sides of the cartridge to a point adjacent the front wall of the cartridge. The cover will thus be separated from the box-like member 10 in the manner indicated in FIG. 2 by its being bent. When the cover is torn from the box-like member and bent back to the extent shown in FIG. 5 the take-up roll of film F will be rotatably supported on the cover by reason of the hub of its take-up spool T being rotatably engaged in the hole 15 in the cover member 11. The film can then be removed from the cartridge C by pulling the free end thereof off the roll, leading it around a guide roller R and attaching it to a rewind roll, not shown, which will wind it out of the cartridge and onto the rewind roll for subsequent processing.

In order to keep the hub of the take-up spool T of the roll of film from jumping out of the hole 15 in the cover 11 during this rewinding operation, a hold-down member 57 may be pivoted about a cross bar 58 from the position shown in FIG. 5 to one in which a notch 59 therein straddles the hub of the take-up spool T while the fingers thereof lightly engage the face of the roll of film F to hold it on the cover 11. This hold-down member 57 can also be used to provide an adjustable drag on the take-up roll of film as it is being rewound for processing. The platform 43 is moved down to its cartridge opening position by pressing down on a handle 60 fixed to and extending away from the edge of the platform which is remote from its pivot points 44. Engagement between stop members 61 fixed to the platform and cross bar 58 limits the movement of the supporting platform 43 as it is moved by pressing down upon the handle 60.

It is desirable to latch the platform 43 in its cartridge receiving position until a cartridge is properly positioned in the receiver to be opened. To this end, a latch member 63 extends substantially vertically through a slot 64 in the stationary plate 50 and is pivoted at one end in a U-shaped bracket 65 fixed to the top surface of the plate. The other end of the latch member 63 is shaped as a hook 66 which is adapted to extend into a slot 67 in the knife member 46 and drop over a latch pin 68 when the platform 43 is raised to its cartridge receiving position, see FIGS. 3 and 4, from its cartridge opening position, see FIG. 5. The latch member can be spring urged to its latching position, or as in the present instance, where the loading plane of the receiver is inclined, gravity can be relied upon to drop it into latching position with the latch pin 68. The edge of the latch member facing notch 52 in plate 50 has an adjusting screw 69 threaded thereinto. When the screw is properly adjusted it will be engaged by the rear wall 17 of the cartridge C as it is pushed into the cartridge receiver whereupon the latch will be released when the cartridge is properly located in the receiver to be opened by swinging the platform 43 downwardly.

It is possible to shove the film cartridge C from the loading table 40 up into the cartridge receiver 35 either manually or by manually operated means, but in order to make the device automatic and require as little thought and work on the part of the operator as possible, we have provided a motor-driven ram which will now be described.

Referring to FIGS. 3 and 4, the ram mechanism comprises a ram rod 70 slideably mounted in a bearing block 71 supported on an inclined surface 72 of a bracket 73 extending at right angles from the supporting wall 31. On the forward end of the ram rod there is fixed a cartridge ram or pusher 74 the forward face 75 of which is adapted to engage the front wall 16 of the cartridge C on the loading table 40 to shove the cartridge from the table 40 up into the cartridge receiver 35 when the ram rod is moved from its "Out" or loading position, see FIG. 3, to its "In" position, see FIG. 4, wherein it has shoved the cartridge C into the receiver 35. The ram is driven through one complete cycle of operation by a single revolution of a shaft 76 driven by a geared-down electric motor M. A crank arm 77 fixed to the motor driven shaft 76 carries a crank pin 78 engaging an elongated slot 79 in a lever 80 pivoted at one end 81 to wall 31 and at the other end 82 to a link 83 which is in turn pivoted at 84 to the end of ram rod 70.

As shown in FIGS. 3 and 7, a ram cycling single pole double-throw switch 90 fixed to the wall 31 is connected into the motor circuit and is controlled by a cam 91 fixed to shaft 76 so that after the "load" switch 92 in the circuit is pushed, the motor will be energized and stay energized until the ram reaches its full "In" position. At this time the roller on the actuating arm of switch 90 will drop off the high portion of the cycling cam 91 and the switch 90 will revert to its normal position to cut off the current to the motor. Now after the cartridge has been opened and the film removed therefrom, the operator pushes the eject switch 93 and the motor is again started to move the ram to its "Out" position. At this time the roller of switch 90 again rides upon the high side of cam 91 which again reverses switch 90 so that the motor is stopped. To make sure that the ram mechanism cannot be started until there is a film cartridge in proper position on the loading table 40, a normally open, cartridge operated switch 95 is placed in the motor circuit to be closed by a cartridge when it is properly positioned on the loading table 40. As shown more clearly in FIG. 4, this switch 95 is controlled by a spring finger 96 which normally extends upwardly through a slot in the loading table 40 and which will be engaged and depressed to a switch closing position by the leading edge of the cartridge being pushed into proper position on the loading table 40 from the loading tray 39. While in FIG. 5 the load and eject switches 92 and 93 are shown as push-button switches, in the circuit diagram of FIG. 7 they have been shown as a single pole, double throw switch because as one is closed the other must be open.

To prevent coasting of the motor M when current is cut off therefrom, the motor is electrically braked each time the motor winding is de-energized. Referring to FIG. 7, this is accomplished by charging a capacitor 97 through a rectifier 98, resistor 99 combination during the time the motor is energized and then discharging this capacitor back through the motor when it is de-energized to thereby apply an electrical brake to the motor. More specifically, when the ram mechanism is in its "Out" position and switch 90 is held in the position shown in FIG. 7 and cartridge switch 95 is closed by the presence of a cartridge on the loading table 40, the closing of "load" switch 92 will energize the relay 100 in turn will close normally open switch 101 in parallel with switch 95 and pull lever 102 of the double-pole, single throw switch from its normal position where it engages contact 103 to a position where it engages contact 104. The motor M will now run until cycle cam 91 allows switch 90 to assume its normal position connecting to the eject switch 93 into the circuit and cutting current off the motor M and the relay 100. Just as soon as the relay 100 is de-energized, lever 102 swings to its normal position engaging contact 103 and the condenser 97 discharges back through the motor to electrically brake it. The switch 101 is placed in parallel with the cartridge actuated switch 95 to keep the motor running thoughout the "In" stroke of the ram even though the cartridge C releases switch 95 some time before it is completely shoved into the receiver 35. The main switch S is provided in the 115 v. line to place the motor circuit in condition to operate or remove it from the power source completely.

In order to prevent a cartridge from being shoved from the loading tray 39 onto the loading table 40 when the ram is in its "In" position, a tail piece 200 is fixed to the rear of the pusher 74 to extend into and block the opening 37 in the offset portion 36 of the wall 31 through which a cartridge must pass in moving from tray 39 to the loading table.

The empty film cartridge is extracted from the cartridge receiver 35 by the return motion of the ram mechanism to its loading position. To this end the pusher or ram 74 is equipped with two spaced spring-loaded pins 105 which during the later stage of the "In" or loading movement of the ram extend into the recesses 18 located in the bottom 13 of the cartridge and near the corners adjacent the front wall thereof, see FIGS. 4 and 6. This engagement of the pins 105 with the recesses 18 of the cartridge is accomplished by moving the ram rod 70 and ram 74 along a line which intersects the plane of the loading table 40 and the platform 43 of the cartridge receiver. As the ram 74 advances its face moves down on the front wall of the cartridge until during the later stage of the "In" movement of the ram the pins 105 engage the bottom of recesses 18 and are moved upwardly relative to the ram to compress their springs 107, see FIGS. 3 and 6. Now when the ram 74 is reversed and moved to its "Out" position, pins 105 will pull the cartridge C from the receiver 35.

In order to deposit the extracted cartridge C into a refuse receptable, not shown, means have been provided to drop the loading table 40 out of its loading position when the handle 60 is depressed to open the cartridge. To this end, the platform 43 of the cartridge receiver and the loading table 40 are connected together by a linkage consisting of a bar 110 pivoted at one end 111 to the loading table 40 and a bar 112 pivoted at one end 113 to the platform 43. The other end of each of these bars 110 and 112 are rotatably connected to a rod 114 which extends between supporting walls 30 and 34 and is slideably mounted in an elongated vertical slot 115 therein. While only one pair of linking bars 110 and 112 has been shown in FIG. 4 adjacent wall 30, it will be appreciated that a corresponding pair of such bars is located at the other side of the cartridge receiver adjacent wall 34. When handle 60 is in its raised position, the bar 112 pulls the rod 114 to the top of slot 115 and this in turn pivots the loading table 40 to its loading position. On the other hand, when handle 60 is depressed to lower platform 43 to its cartridge opening position the rod 114 is pushed toward the bottom of slot 115 and loading table 40 is pulled down to a substantially vertical position, see dotted line position in FIG. 4. Since these parts are in this position when the ram mechanism is retracted, when the empty cartridge C is pulled from the cartridge receiver it drops from pins 105 of the ram 74 when it reaches the opening left by the loading table 40 being in its lowered position. A refuse receptacle, not shown, can be placed below this opening to collect the opened cartridges as they are extracted from the cartridge receiver.

In order to prevent the film cartridge from being fed from tray 39 when the loading table 40 is in its lowered position, the loading table 40 has a stop member 120 fixed thereto adjacent its pivot point and which stop member moves into a position to block the opening 37 in wall portion 36 when the table is in its lowered position. This stop member 120 is immediately adjacent the tail piece 200 on the rear end of ram 74 which serves the same purpose when the ram is in its "Forward" or "In" position, see FIG. 4.

Referring now to FIGS. 9 and 10, we will describe a cartridge opening apparatus designed to carry out the modified method of opening a cartridge C as shown in FIG. 8, and where the cover 11 is bent over a heated bar to destroy the plastic memory of the plastic material from which it is made and/or a heated knife is used to rupture the seal between the cover and box-like member of the cartridge.

This apparatus includes a cartridge receiver 135 consisting of an L-shaped member pivoted on an axis A, extending perpendicular to the drawing, to move between a horizontal loading position, see FIGS. 9 and 10, and a cartridge opening position, see FIG. 11. The pivotal axis A for the receiver 135 is defined by a pair of hinge pins, not shown, carried by opposite sides of the receiver and rotatably engaging bearings, or the like, not shown, in a pair of spaced vertical supports, only one of which is shown at 136. The receiver 135 is open at one or both sides opposite to the two shown in FIGS. 9–11 so that a cartridge C can be manually, or otherwise, slid thereinto edgewise. The top wall of the receiver may be provided with a hole 137 which opens into the side of the receiver into which the cartridge is to be loaded so as to permit an operator to grasp hold of a cartridge to load and unload it relative to the receiver. When a cartridge is slid edgewise into the receiver, a lip 138 on the receiver overhangs the flange 14 on the bottom 13 of the box-like member 10 and the cover is supported on a bar 141 which extends between the vertical supports 136 in spaced parallel relation with the pivotal axis A. This bar which forms a fulcrum about which the cover is bent as the receiver 135 is swung to its cartridge opening position, see FIG. 11, is heated by an electric heater H imbedded therein to a temperature above the softening point of the thermoplastic material from which the cover is made. The result is that once the cover is bent back away from the box-like member to provide access to the film therein, it will remain in this open position even after it has been removed from the receiver. This differs from the opening method carried out by the device shown in FIGS. 3–7 wherein the cover 11 must be held open by the separation of the platform 43 and the plate 50 because the instant the cartridge is retracted from this receiver 35 the cover will tend to snap closed because of the plastic memory of the material from which it is fabricated.

Going back a step, after the cartridge C is loaded into the receiver 135, a knife blade 150 is moved from the inoperative position shown in FIG. 9 to the operative position shown in FIGS. 10 and 11 where it ruptures the seal between the cover 11 and the box-like member 10. To facilitate rupturing the seal at this point the knife blade 150 may be heated above the softening point of the plastic from which the cartridge is made by an electric heater 151 imbedded in the support 152 for the blade as close to the blade as possible. It will be seen that the knife blade 150 after it has been moved to its operative position overhangs the edge, or flange 12, of the cover and acts to hold it stationary as the box-like member is moved upwardly and away therefrom about fulcrum bar 141 as the receiver is swung to its vertical position. It is this movement of the box-like member which tears the seal between the box-like member and cover progressively from the initial point of rupture completely along the side walls thereof to a point adjacent the fulcrum bar 141. After the cartridge is opened the roll of film will be rotatably supported in the hole 15 in the cover so that it can be rewound from the cartridge while it is supported by the receiver 135. However, since the cover will remain open because the plastic memory at the hinge line 20 of the cover has been destroyed, the opened cartridge can be slid out of the cartridge receiver and then moved to another fixture for rewinding the film off the takeup spool while the opening device can again be immediately reloaded to open another cartridge.

While we have shown and described certain specific embodiments of our invention we are fully aware that many modifications thereof are possible. Our invention, therefore, is not to be restricted to the precise details of instruction shown and described but is intended to cover all modifications coming within the scope of the appended claims.

We claim:

1. The method of opening a film cartridge to permit removal of a film strip therefrom, said cartridges consisting of a plastic box-like member within which a roll of film is confined by a plastic cover member sealed to the open end of said box-like member in covering relation therewith and overhanging at least one edge of said box-like member to provide a projection by which the cover can be grasped, comprising the steps of rupturing the seal between said cover member and box-like member along said edge of the box-like member said cover overhangs; separately grasping said box-like member and the cover by said projection adjacent said ruptured portion of said seal, and pulling the box-like member and cover apart in opposite directions from the ruptured portion of said seal to break the seal between the two progressively from the initial point of rupture toward the edge opposite that ruptured, and which latter edge remains sealed and acts as a hinge between the two parts.

2. The method of opening a film cartridge according to claim 1, in which the step of pulling said box-like member and cover apart comprises holding said box-like member stationary and pulling on said projection in a direction to bend said cover about a line adjacent the edge of the same opposite that along which the initial rupture was made.

3. The method of opening a film cartridge according to claim 1, in which the step of pulling said box-like member and cover apart comprises holding said cover stationary and pulling the box-like member away therefrom in a direction to bend said cover about a line adjacent the edge of the same opposite that along which the initial rupture was made.

4. The method of opening a film cartridge according to claim 1, in which the step of rupturing said seal includes the step of inserting a heated blade into the sealed joint between the cover and the box-like member to soften the seal between the two parts so that it can be broken by pulling said box-like member and cover apart.

5. The method of opening a film cartridge according to claim 1 including the step of heating the cover along a line adjacent the edge opposite that grasped for opening the cartridge sufficiently to soften the plastic material from which said cover is made to facilitate bending of the cover along this line and to destroy the plastic memory of the plastic material along this line so that the cover will remain open rather than tend to reclose when it is released.

6. Apparatus for opening a film cartridge to permit removal of a film strip therefrom, said cartridge comprising a plastic box-like member within which a roll of film is confined by a plastic cover member sealed to the open end of said box-like member in covering relation therewith and overhanging at least one edge of said box-like member to provide a flange by which the cover can be grasped, and comprising in combination:

(1) a cartridge receiver into which a cartridge can be inserted edgewise and including,
(a) means for gripping said box-like member,
(b) means for grasping hold of said flange on said cover member,
(c) means for mounting said gripping and grasping means so they can move relative to one another from a cartridge receiving position to a cartridge opening position, (2) a knife member disposed relative to said cartridge receiver so as to rupture a portion of said seal between the box-like member and said cover at one edge of said cartridge upon relative movement between the knife and said cartridge when the cartridge is supported by said cartridge receiver; and (3) means for moving said gripping and grasping means relative to one another to a cartridge opening position after said knife has ruptured said seal to tear the remainder of said seal along three adjoining edges of said cartridge progressively from the point of rupture made by said knife by bending said cover member away from said box-like member to provide access to the film strip therein.

7. Film cartridge opening apparatus according to claim 6, in which said means for mounting said gripping and grasping means so that they can move relative to one another from a cartridge receiving position to a cartridge opening position comprises
(a) means for pivotally mounting at least one of said gripping and grasping means to pivot relative to the other of said means about an axis located adjacent the edge of the cartridge supported by said cartridge receiver which is directly opposite that edge ruptured by said knife.

8. Film cartridge opening means according to claim 7, in which the cover member of said cartridge is made of a thermoplastic material, and including a heated fulcrum bar against and about which said cover member is hinged as said gripping and grasping means are moved to their cartridge opening position, said fulcrum bar being heated to a temperature above the softening temperature of said thermoplastic material to facilitate bending of said cover member and to destroy the plastic memory of the cover member at this hinge point so that it will remain separated from the box-like member when the opened cartridge is removed from said cartridge receiver.

9. Apparatus for opening a film cartridge to permit removal of a film strip therefrom, said cartridge including a substantially rectangular plastic box-like member within which a roll of film is confined by a plastic cover member sealed to the open end of said box-like member in covering relation therewith and overhanging at least two opposite edges of said box-like member to provide a flange by which the cover can be grasped to the exclusion of the box-like member, and comprising in combination (1) a loading table onto which a film cartridge can be positioned with said cover member engaging said table;

(2) a cartridge receiver into which a cartridge is fed edgewise from said loading table to be opened and including,
(a) a supporting platform pivoted to move between a cartridge receiving position and a cartridge opening position,
(b) a pair of clamps fixed in spaced relation onto said supporting platform to overhang said flange along opposite sides of said cover member as a cartridge is slid into said receiver from said loading table and clamp said cover to said supporting platform,
(c) stationary means for gripping said box-like member to the exclusion of said cover when a cartridge is inserted into said receiver, (3) knife means fixed to said supporting platform to penetrate and rupture the seal between said cover and said box-like member at a point on one edge of said cartridge as said cartridge is fed into said receiver, and (4) means for pivoting said supporting platform to its cartridge opening position after said cartridge is fully inserted into said receiver to bend said cover member away from said box-like member starting with the edge of the cover at which the seal has been ruptured and during which movement the seal between the cover member and box-like member is progressively torn along three adjacent edges of the box-like member and the cover is bent away from said box-like member by a sufficient amount to permit removal of the film strip from the cartridge.

10. Film cartridge opening apparatus according to claim 9, including a reciprocal ram movable from an initial position to a loading position for pushing a cartridge from said loading table into said cartridge receiver; a prime mover for reciprocating said ram; and means rendering said prime mover inoperative for driving said ram from its initial position unless a cartridge is positioned on said loading table in proper position to be inserted into said cartridge receiver by said ram.

11. Film cartridge opening apparatus according to claim 10, in which said prime mover is an electric motor, and said last-mentioned means includes a normally open safety switch in the circuit of said motor which is closed by a film cartridge when properly positioned on said loading table for insertion by said ram into said cartridge receiver.

12. Film cartridge opening apparatus according to claim 9, including a releasable latch for preventing movement of said supporting platform from its cartridge receiving position to its cartridge opening position; and means for releasing said latch when a film cartridge is fully inserted into said cartridge receiver.

13. Film cartridge opening apparatus according to claim 9, including a reciprocal ram movable from an initial position to a loading position for pushing a cartridge from said loading table into said cartridge receiver and back to its initial position after the film has been removed from said cartridge; means associated with said ram for positively engaging said box-like member after it has pushed a cartridge into said cartridge receiver and maintaining such engagement during a sufficient part of the return stroke of said ram to pull the empty cartridge from said cartridge receiver during the initial part of its return movement to its initial position.

14. Film cartridge opening apparatus according to claim 13, in which said loading table is pivoted to move between a cartridge receiving position and a cartridge reject position in the latter of which it allows an opened cartridge being pulled from said cartridge receiver by said ram to drop into a waste receptacle when released by said ram; means connecting said loading table to said means for pivoting said supporting platform to its cartridge opening position to pivot said loading table between said cartridge receiving position and said cartridge reject position when said supporting platform is pivoted between its cartridge receiving position and its cartridge opening position, respectively.

15. Film cartridge opening apparatus according to claim 14, including means for preventing insertion of a film cartridge onto said loading table when said table is in its reject position or when said ram is in any position other than its initial position.

16. Film cartridge opening apparatus according to claim 9, in which the bottom of the box-like member of said cartridge to be opened is provided with a recess adjacent the edge to be engaged by said ram, and in which said means associated with said ram for positively engaging said box-like member after it has pushed a cartridge into said receiver, includes a spring loaded pin carried by the ram and extending vertically of and beyond the cartridge engaging face of said ram, the line of movement of said ram being inclined to the plane of movement of the cartridge defined by said loading table and cartridge receiver to such an extent that said spring loaded pin engages said recess in the bottom of said cartridge during that portion of the ram movement in which the cartridge is in engagement with said receiver.

17. Apparatus for opening a film cartridge to permit removal of a film strip therefrom, said cartridge including a substantially rectangular box-like member within which a roll of film is confined by a thermoplastic cover member sealed to the open end of said box-like member in covering relation therewith and overhanging at least one edge of said box-like member to provide a flange by which the cover can be grasped to the exclusion of the box-like member, and comprising in combination (1) a cartridge receiver into which a film cartridge is insertable edgewise and including
  (a) means for gripping said box-like member to the exclusion of said cover member when a cartridge is inserted thereinto, (2) means for pivotally mounting said cartridge receiver to move between a loading position and a cartridge opening position;

(3) a knife movable to and from an operative position wherein it penetrates and ruptures the seal between said box-like member and said cover member along one edge of a cartridge inserted into said receiver when said receiver is in its loading position, and in which position said knife overhangs said flange to grasp said cover to the exclusion of said box-like member;

(4) means for moving said cartridge receiver to its cartridge opening position after said knife has moved to its operative position to swing said box-like member away from said cover member and tear said seal between the two progressively along three adjacent edges of the cartridge starting from the point ruptured by movement of said knife to its operative position;

(5) a stationary fulcrum bar extending substantially parallel to the pivot point of said receiver and extending across and engaging the surface of said cover member adjacent the edge of said cover opposite that edge which said knife overhangs when it is moved to its operative position and about which fulcrum bar said cover is bent when said receiver is moved to its cartridge opening position while said knife is in its operative position.

18. A film cartridge opening apparatus according to claim 17, and including means for heating said fulcrum bar to a temperature sufficient to soften the thermoplastic material of which said cover member is made so as to facilitate hinging of said cover member around said fulcrum bar and to destroy the plastic memory of the cover member at this hinge point so that said cover member will remain open even after the cartridge is removed from said receiver.

19. A film cartridge opening apparatus according to claim 17, for opening a cartridge the box-like member of which is made of a thermoplastic material as well as the cover member, and including means for heating said knife above the softening point of the thermoplastic material of which the box-like member is made to facilitate penetration and rupture of the seal between the box-like member and the cover member when the knife is moved to its operative position.

No references cited.

WILLIAM W. DYER, JR., *Primary Examiner.*

J. M. MEISTER, *Assistant Examiner.*